United States Patent
Dye et al.

(10) Patent No.: US 10,236,801 B2
(45) Date of Patent: Mar. 19, 2019

(54) DOOR CLOSER SYSTEM

(71) Applicant: Schlage Lock Company LLC, Indianapolis, IN (US)

(72) Inventors: William P. Dye, Indianapolis, IN (US); Ian K. Heckman, Noblesville, IN (US); Yong Kwan Lacy, Carmel, IN (US); Brendon Allen, Indianapolis, IN (US); Brian C. Eickhoff, Danville, IN (US); Ron M. Kielkowski, Noblesville, IN (US); Dale M. Collins, Colorado Springs, CO (US); David V. Toloday, Martinsville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 49 days.

(21) Appl. No.: 13/889,769

(22) Filed: May 8, 2013

(65) Prior Publication Data
US 2013/0340343 A1    Dec. 26, 2013

Related U.S. Application Data

(60) Provisional application No. 61/644,385, filed on May 8, 2012.

(51) Int. Cl.
  *E05F 1/10*    (2006.01)
  *E05F 15/614*   (2015.01)
  (Continued)

(52) U.S. Cl.
  CPC ............... *H02P 3/14* (2013.01); *E05F 1/105* (2013.01); *E05F 3/22* (2013.01); *E05F 15/614* (2015.01);
  (Continued)

(58) Field of Classification Search
  CPC . E05F 1/10; E05F 1/1041; E05F 5/027; E05F 15/04; E05F 1/105; E05F 15/619;
  (Continued)

(56) References Cited

U.S. PATENT DOCUMENTS

| 2,087,968 A | 7/1937 | Dodge |
| 2,970,680 A | 2/1961 | Cain |

(Continued)

FOREIGN PATENT DOCUMENTS

| CN | 1076243 A | 9/1993 |
| CN | 101802335 A | 8/2010 |

(Continued)

OTHER PUBLICATIONS

International Search Report and Written Opinion, dated Aug. 21, 2013, International Patent Application No. PCT/US2013/40116, ISA/US. 11 pgs.

(Continued)

*Primary Examiner* — Emily M Morgan
(74) *Attorney, Agent, or Firm* — Taft Stettinius & Hollister LLP

(57) ABSTRACT

A door closer system is provided that includes a motor, a spring, a reduction gear set, and a rack and a pinion mechanism. The spring and pinion may be coupled to the rack, and the pinion may be selectively coupled to the gear set. The motor may be selectively mechanically coupled to the gear set. The pinion may rotate in a first direction via the rack as the spring is compressed in a second direction opposite the first direction as the spring is expanded. The motor is operable to rotate and act upon the pinion through the gear set, thereby rotating the pinion in the second pinion direction and assist the spring in closing the door.

18 Claims, 6 Drawing Sheets

(51) Int. Cl.
    *H02P 3/14*           (2006.01)
    *E05F 3/22*           (2006.01)
    *E05F 15/619*        (2015.01)

(52) U.S. Cl.
    CPC ....... *E05F 15/619* (2015.01); *E05Y 2201/412* (2013.01); *E05Y 2400/302* (2013.01); *E05Y 2400/612* (2013.01); *E05Y 2400/616* (2013.01); *E05Y 2900/132* (2013.01)

(58) Field of Classification Search
    CPC ............. E05F 15/614; E05Y 2201/474; E05Y 2201/412; E05Y 2400/614
    USPC ....... 16/49, 64, 71, 79, 72; 49/333, 334, 336
    See application file for complete search history.

(56) References Cited

U.S. PATENT DOCUMENTS

| | | | | |
|---|---|---|---|---|
| 3,338,361 | A | 8/1967 | Hoff | |
| 3,367,465 | A | 2/1968 | Newman | |
| 3,415,562 | A * | 12/1968 | Petersen | 292/273 |
| 3,581,857 | A | 6/1971 | Dallman | |
| 3,797,331 | A | 3/1974 | Kjeldsteen | |
| 3,934,306 | A * | 1/1976 | Farris | 16/48.5 |
| 4,062,433 | A | 12/1977 | St. John | |
| 4,160,389 | A | 7/1979 | Kubono | |
| 4,226,320 | A | 10/1980 | St. John | |
| 4,289,995 | A | 9/1981 | Sorber et al. | |
| 4,296,852 | A | 10/1981 | Luerken | |
| 4,610,343 | A | 9/1986 | Hikari | |
| 4,690,257 | A | 9/1987 | Suzuki et al. | |
| 4,756,396 | A | 7/1988 | Nagashima et al. | |
| 4,960,194 | A | 10/1990 | Sageshima et al. | |
| 4,973,894 | A * | 11/1990 | Johansson | E05F 1/1016 318/266 |
| 5,010,994 | A | 4/1991 | Heireth et al. | |
| 5,018,304 | A * | 5/1991 | Longoria | 49/340 |
| 5,193,647 | A | 3/1993 | O'Brien, II | |
| 5,243,735 | A | 9/1993 | O'Brien, II | |
| 5,386,885 | A | 2/1995 | Bunzl et al. | |
| 5,438,799 | A * | 8/1995 | Le Faucheur | E01F 13/085 49/131 |
| 5,513,467 | A * | 5/1996 | Current et al. | 49/340 |
| 5,594,316 | A | 1/1997 | Hayashida | |
| 5,687,507 | A * | 11/1997 | Beran | 49/340 |
| 5,746,250 | A * | 5/1998 | Wick | 137/624.11 |
| 5,910,075 | A | 6/1999 | Arnel et al. | |
| 6,633,094 | B1 | 10/2003 | Andou | |
| 7,522,042 | B2 | 4/2009 | Milo | |
| 7,571,515 | B2 * | 8/2009 | Fischbach et al. | 16/79 |
| 7,816,875 | B2 * | 10/2010 | Taheri | E06B 9/70 310/178 |
| 7,952,477 | B2 | 5/2011 | Fogg | |
| 8,169,169 | B2 * | 5/2012 | Hass | E05F 15/63 318/257 |
| 8,248,005 | B2 | 8/2012 | Romer | |
| 8,359,790 | B2 | 1/2013 | Shin | |
| 8,547,046 | B2 | 10/2013 | Burris et al. | |
| 8,564,235 | B2 | 10/2013 | Burris et al. | |
| 8,773,237 | B2 * | 7/2014 | Burris et al. | 340/3.32 |
| 2003/0213092 | A1 * | 11/2003 | Fischbach | E05F 3/102 16/52 |
| 2006/0244271 | A1 | 11/2006 | Hass | |
| 2009/0265992 | A1 * | 10/2009 | Hass | E05F 15/63 49/340 |
| 2011/0252598 | A1 * | 10/2011 | Burris et al. | 16/62 |
| 2011/0252845 | A1 | 10/2011 | Webb et al. | |
| 2011/0257796 | A1 * | 10/2011 | Burris et al. | 700/282 |
| 2012/0029701 | A1 * | 2/2012 | Houser | 700/275 |
| 2012/0210647 | A1 | 8/2012 | McKibben et al. | |
| 2014/0346997 | A1 * | 11/2014 | Salutzki et al. | 318/628 |
| 2015/0262438 | A1 * | 9/2015 | Zasowski | G07C 9/00126 340/5.51 |
| 2015/0298765 | A1 * | 10/2015 | Golden, Jr. | A61G 5/10 180/206.3 |

FOREIGN PATENT DOCUMENTS

| | | |
|---|---|---|
| DE | 102010019357 A1 | 11/2011 |
| EP | 0559947 A1 | 9/1993 |
| GB | 2479157 | 10/2011 |
| JP | 2005124347 A | 5/2005 |

OTHER PUBLICATIONS

Chinese Search Report; Chinese Patent Office (State Intellectual Property Office of People's Republic China); Chinese Patent Application No. 201380036451.4; dated Oct. 23, 2015; 5 pages.

Chinese First Office Action; Chinese Patent Office (State Intellectual Property Office of People's Republic China); Chinese Patent Application No. 201380036451.4; dated Nov. 4, 2015; 22 pages.

Chinese Second Office Action; Chinese Patent Office (State Intellectual Property Office of People's Republic China); Chinese Patent Application No. 201380036451.4; dated May 26, 2016; 23 pages.

European Extended Search Report; European Patent Office; European Patent Application No. 13788368.2; dated Feb. 1, 2016; 9 pages.

Chinese Decision of Rejection; Chinese Patent Office (State Intellectual Property Office of People's Republic China); Chinese Patent Application No. 201380036451.4; dated Dec. 5, 2016; 24 pages.

Mexican First Office Action; Mexican Patent Office; Mexican Patent Application No. MX/a/2014/013663; dated Dec. 14, 2016; 4 pages.

Mexican Office Action; Mexican Patent Office; Mexican Patent Application No. MX/a/2014/013663; dated May 29, 2017; 5 pages.

Chinese Notification of Reexamination; Chinese Patent Office (State Intellectual Property Office of People's Republic China); Chinese Patent Application No. 201380036451.4; dated Sep. 5, 2017; 19 pages.

Mexican Office Action; Mexican Patent Office; Mexican Patent Application No. MX/a/2014/013663; dated Nov. 22, 2017; 9 pages.

Chinese Decision of Reexamination; Chinese Patent Office (State Intellectual Property Office of People's Republic China); Chinese Patent Application No. 201380036451.4; dated Jan. 25, 2018; 26 pages.

Mexican Office Action; Mexican Patent Office; Mexican Patent Application No. MX/a/2014/013663; dated Aug. 8, 2018; 6 pages.

* cited by examiner

DOOR CLOSER SYSTEM

CROSS REFERENCE TO RELATED APPLICATIONS

The present application claims priority to and benefit under 35 U.S.C. § 119(e) to U.S. Provisional App. No. 61/644,385, filed May 8, 2012, the entire contents of which are incorporated herein by reference.

TECHNICAL FIELD

The present disclosure generally relates to door closer systems and more particularly, but not exclusively, to self-powered door closer systems.

BACKGROUND

Alleviating difficulties found in operating door closers remains an area of interest. Present door closers suffer from a variety of limitations and disadvantages relative to certain applications. Door closers are utilized in many applications where a door must be shut after opening. This allows the user to pass through the doorway without manually closing the door. Door closers may utilize a spring assembly to close the door and a damper to ensure that the door does not slam closed. In order for the spring to properly shut the door, the door closer may be configured such that the spring is compressed upon opening the door and allowed to expand in order to close the door.

Government regulations may require that the door be capable of opening with a limit on the force required for opening. As an example, the United States Americans with Disabilities Act requires a door be capable of opening with a limit of 5 pounds force at 34 inches from the door hinge line. Utilizing a spring that allows a door to open within these limits may not be strong enough to close the door. Such conditions that would prevent the door from closing with a weak spring may include, for example, a pressure differential across the doorway, a heavy door, high friction within the door system, or a combination thereof. In order to stay within the above-described limits, some door closers have incorporated a motor to assist in opening and closing the door that requires a source of external power. While there have been various attempts at improving door closing technology, there is a need for further contributions to this technology.

SUMMARY

One embodiment of the present disclosure is a unique door closer with a motor that is self-powered for closing doors. Other embodiments include apparatuses, systems, devices, hardware, methods, and combinations for the same. Further embodiments, forms, features, aspects, benefits, and advantages of the present application shall become apparent from the description and figures provided herewith.

DETAILED DESCRIPTION

Figure 1:
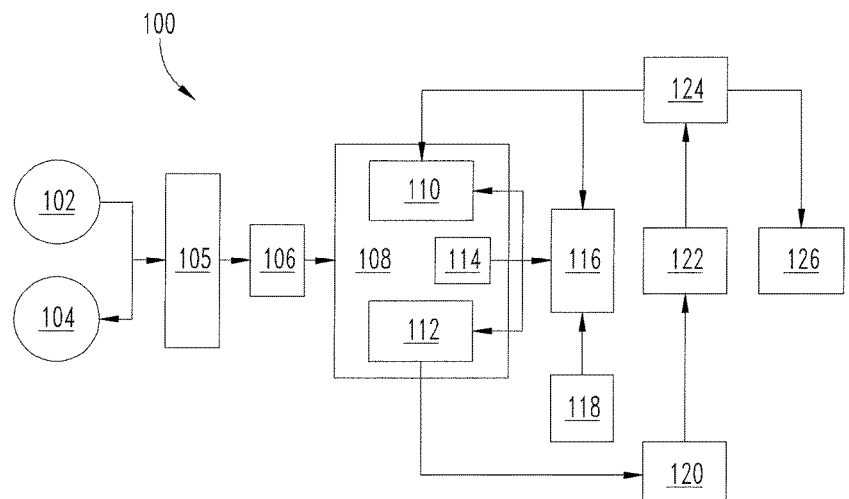
FIG. 1 is a schematic illustration of an embodiment of a door closing system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an example of a door and door closer system 100 is provided in schematic form. The system 100 is provided to assist in closing a door 105 located in a doorway. As used herein, a closed door is a door that is latched or substantially flush with the door frame. An open door is any door that is not closed. The system 100 is provided with inputs of a spring force 102, which can be provided from a spring of the door closing system and a user applied force 104. The user force 104 is applied to a door (not shown) while opening the door, during which process the spring supplying spring force 102 is compressed. As discussed herein, the spring of the door closer system 100 may be an assembly of one or more springs, and may be any combination of linear or rotational springs. The spring force 102 is generated by the compressed spring as it expands upon closing of the door. The spring and user forces 102, 104 flow through a mechanical interface 106 to a motor 108. The mechanical interface 106 may be, for example, an arm attached to a reduction gear set, which may include, for example, a rack and pinion, a spur gear set, a planetary gear set, or any combination thereof.

An electric motor 108 may be attached to the other end of the mechanical interface. The motor 108 may be of any known variety, such as a brushed or brushless DC permanent magnet motor. The motor 108 may impede the closing of a door, such as by providing a brake or dampening force during opening and/or closing of the door as indicated by braking and dampening module 112. Motor 108 may also provide an extra boost force to ensure the door closes completely as indicated in power boost module 110. During the process of opening the door by a user or during closing of the door under spring force 102, the motor 108 may also act as an electric generator and harvest energy. The motor 108 may also provide operational data 114 via feedback control sensors (not shown) to a control circuit 116, and control circuit 116 may receive inputs in response to changes in programming and other information through a user interface 118 or other controller.

The system 100 is also provided with energy harvesting components 120 for power conditioning by harvesting the power generated by the motor 108 and storing the harvested power with a power storage device 122, which may be, for example, a chargeable battery or a capacitor. The energy stored in the storage device 122 may then be passed through power supply components 124, which can supply power to the motor 108 to provide a closing boost force, supply power to the control circuit 116, or supply power to other features 126 that may require power, such as communications modules, readers, door locks, and controllers, for example.

With reference now to FIGS. 2A-2F and 3, the example system 100 includes a spring 134, a gear set 128, and a rack 132 and pinion 130 forming at least a part of mechanical interface 106. System 100 utilizes energy stored in spring 134 during opening of the door to drive the gear set 128, including rack 132 and pinion 130, and apply torque Ta to motor 108 in order to create current I through control circuit 116. The impedance L of control circuit 116 acts as a damping system on the motor 108. The control circuit 116 also stores electrical energy via a capacitor C or to a battery to be used in the final few degrees of the door closing. The control circuit 116 controls the power release to the motor 108 to provide a boost in the door closing force during the final closing of the door. The system 100 is intended to be operable independently of outside power resources and fully operational for every operation cycle of the door.

In operation, the door is first opened by a user. As described above, various laws and/or regulations may limit the force required to open a door. As an example, the door opening force may be limited to 5 pounds force at 34 inches from the door hinge line to open. For such an example, a spring or spring assembly may be selected or designed accordingly that allows the door to open at such low forces. However, such a spring design may not have sufficient force to close the door under all possible conditions. Furthermore, when an excess opening force is applied to the door, the excess force may be dampened and harvested for storage in storage device 122 subsequent use in operation of system 100 while providing dampening and/or back checking to protect the door and operator.

After opening, the user may release the door allowing the door closer system 100 to close the door. In operation, the door closes in two phases. In a first phase, the spring compression is the only reliably available energy input into the system 100. Therefore, the door initially closes under the force of the spring. As the door closes, mechanical interface 106, such as an arm, rack and pinion mechanism, gear set, and spring utilizes the releasing spring energy to turn the shaft of motor 108. The motor 108 in turn, acting as a generator, generates power that is stored in a power storage device 122. Once the door is substantially closed, the second phase of closing takes place whereby the power is discharged from power storage device 122 to power the motor 108 and provide a boost force to close the door completely. In addition to providing energy to generate the boost force, the stored power may also be used to power the control circuit 116. Therefore, system 100 uses energy harvested from normal door operation and has no external power requirements.

FIGS. 2A-2F provide functional diagrams of the system 100 with numerous variables that may be factored in the considerations that determine the configuration of the system 100. From these diagrams and following equations, the spring force of the system 100 is used to determine the electrical requirements of the motor 108 in order for the motor 108 to provide sufficient boost force for closing of the door. While one specific example is provided below, other inputs and variables may be considered, or the inputs and variables discussed below may be considered in a different manner, depending on different system constraints. The nomenclature of FIGS. 2A-2F includes the following:

X=Linear position/displacement $$\dot{X} = \frac{d}{dt}x(t) = \text{Linear velocity}$$

$$\ddot{X} = \frac{d^2}{dt^2}x(t) = \text{Linear acceleration}$$

$M_r$=Mass of rack
$k_s$=Spring constant of spring
$f_p$=Friction acting on the rack due to the pinion
$f_r$=Friction acting on the rack due to the rack mounting
$F_p$(t)=Force of the pinion acting on the rack as a function of time
$\Theta$=Angular position/displacement $$\dot{\Theta} = \frac{d}{dt}\Theta(t) = \text{Angular velocity}$$

$$\ddot{\Theta} = \frac{d^2}{dt^2}\Theta(t) = \text{Angular acceleration}$$

Figure 2A:
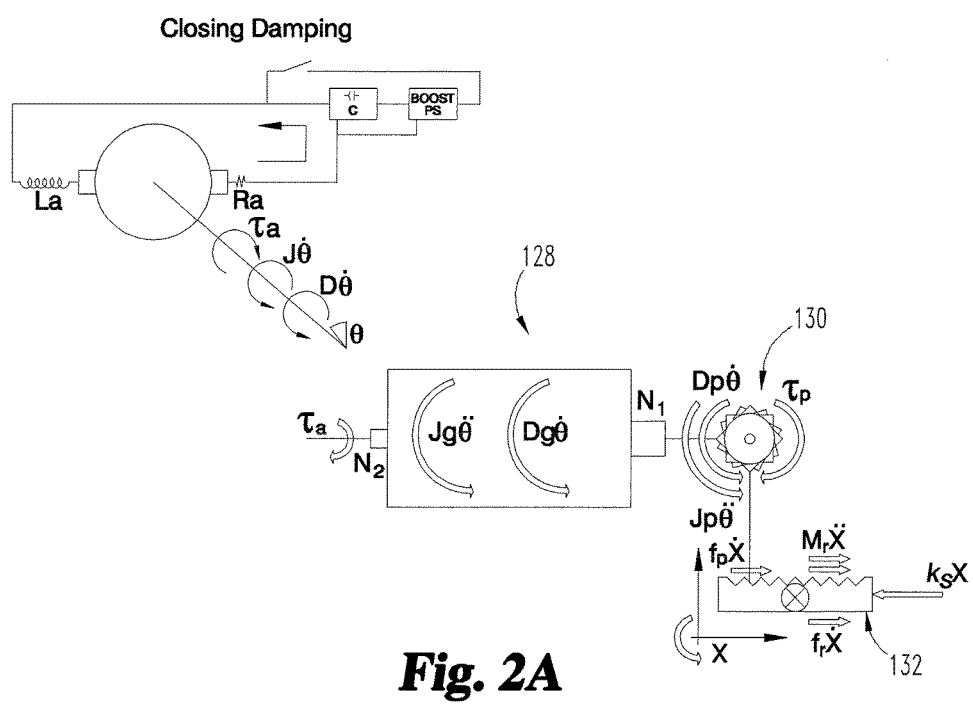
FIG. 2A is a functional system diagram of the electromechanical components of an embodiment of the present disclosure.
Figure 2B:
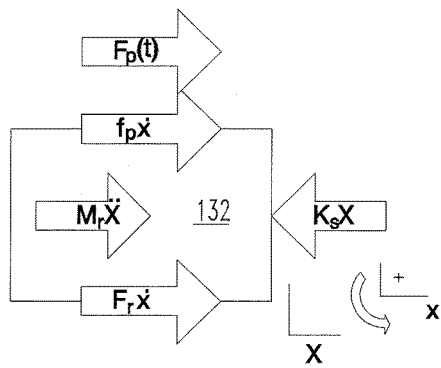
FIG. 2B is a functional system diagram of the rack during a closing phase of the door of an embodiment of the present disclosure.

$J_p$=Angular mass moment of inertia of the pinion
$D_p$=Angular damping coefficient of the pinion
$T_d$=Torque of the door acting on the pinion
$T_y$=Torque of the gears acting on the pinion
$r_p$=Radius of the pinion
$I_g$=Angular mass moment of inertia of the gears in the direction toward the motor
$D_g$=Angular damping coefficient of the gears in the direction toward the motor
$T_m$=Torque of the motor acting on the gears
$T_y$=Torque of the gears acting on the pinion
$N_1$=Gear ratio, pinion side
$N_2$=Gear ratio, motor side
$i_s$=motor current due to armature
$L_a$=Motor armature inductance
C=Capacitance
$R_a$=Armature resistance
$V_a$(t)=Voltage across the armature
Utilizing FIG. 2B as a system diagram:

$$F_p(t) + M_r \cdot \frac{d^2}{dt^2}x(t) + (f_p + f_r) \cdot \left(\frac{d}{dt}x(t)\right) - k_s \cdot x(t) = 0 \quad \text{(eq. 1)}$$

Taking the Laplace transform and solving for $F_p$:

$$F_p(s) = [-M_r \cdot s^2 - (f_p + f_r) \cdot s + k_s] \cdot x(s) \quad \text{(eq. 2)}$$

Figure 2C:
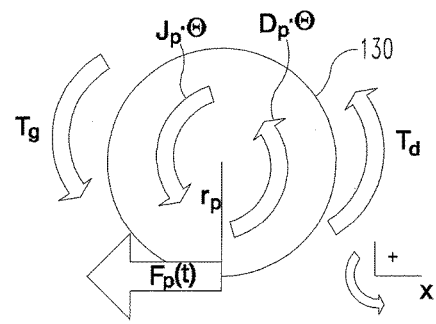
FIG. 2C is a functional system diagram of the pinion during a closing phase of the door of an embodiment of the present disclosure.

Using FIG. 2C as a system diagram:

$$T_g + T_d + J_p \cdot \frac{d^2}{dt^2}\Theta_p(t) + D_p \cdot \left(\frac{d}{dt}\Theta_p(t)\right) - r_p \cdot F_p(t) = 0 \quad \text{(eq. 3)}$$

Taking the Laplace transform and solving for $F_p$:

$$F_p(s) = \frac{T_g + T_d + (J_d \cdot s^2) \cdot D_p(s)}{r_p} \quad \text{(eq. 4)}$$

Figure 2D:
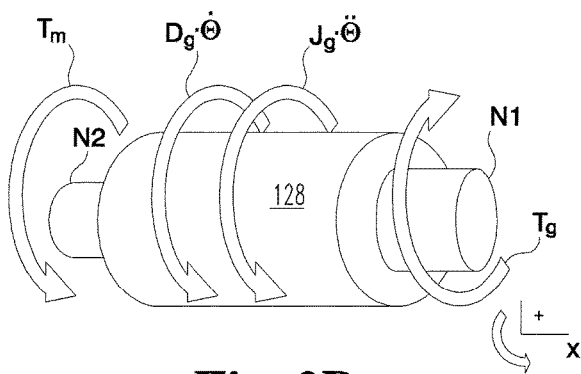
FIG. 2D is a functional system diagram of the gear set during a closing phase of the door of an embodiment of the present disclosure.

Using FIG. 2D as a system diagram:

$$-\frac{N_2}{N_1} \cdot T_g + J_g \cdot \frac{d^2}{dt^2} \Theta_g(t) + D_g \cdot \left(\frac{d}{dt}\Theta_g(t)\right) + T_m = 0 \quad \text{(eq. 5)}$$

Figure 2F:
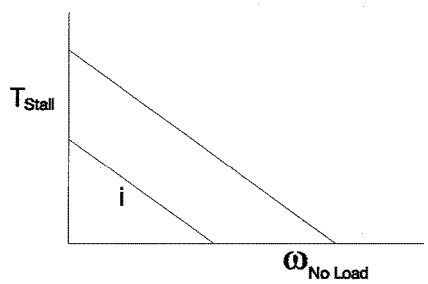
FIG. 2F is a graph of the motor current properties of an embodiment of the present disclosure.
Figure 2E:
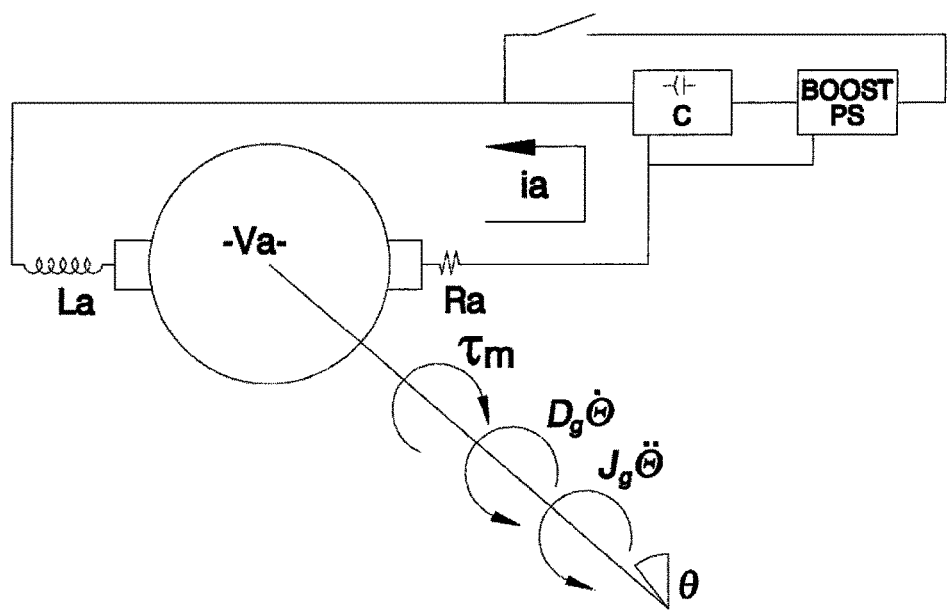
FIG. 2E is a functional system diagram of the motor and circuitry of an embodiment of the present disclosure.

Using FIG. 2E as a system diagram:

$$\left[V_a(t) - \frac{1}{C} \cdot \int_0^\infty i_a(t)\,dt - L_a\left(\frac{d}{dt}i_a(t)\right) - R_a \cdot i_a(t)\right] = 0 \quad \text{(eq. 6)}$$

Assuming that the armature of the motor is rigid and has no measurable angular spring effect, the moments acting on the armature of the motor are:

$$T_m(t) - J_m \cdot \frac{d^2}{dt^2}\Theta(t) - D_m\left(\frac{d}{dt}\Theta(t)\right) = 0 \quad \text{(eq. 7)}$$

Referring to FIG. 2F, the torque of the motor is proportional to the current of the motor:

$$T_m(t) = K_t \cdot i_a(t) \quad \text{(eq. 8)}$$

Motor back voltage is proportional to the armature angular velocity $$V_a(t) = K_b \cdot \left(\frac{d}{dt}\Theta(t)\right) \quad \text{(eq. 9)}$$

From FIG. 2F:

$$\frac{K_t}{R_a} = \frac{T_{stall}}{\omega_{no\,load}} \quad \text{(eq. 10)}$$

Using the relationship of torque to current from the motor properties:

$$i_a(t) = \frac{T_m(t)}{K_t} \quad \text{(eq. 11)}$$

Taking the Laplace transforms of eq. 6, and solving for $T_m$:

$$T_m(s) = (J_m \cdot s^2 + D_m \cdot s) \cdot \Theta(s) \quad \text{(eq. 12)}$$

Therefore:

$$\Theta(s) = \frac{T_m(s)}{(J_m \cdot s^2 + D_m \cdot s)} \quad \text{(eq. 13)}$$

Taking the Laplace transform of eq. 7 and solving for $V_a$:

$$V_a(s) = \left(\frac{1}{C \cdot s} + L_a \cdot s + R_a\right) \cdot i_a(s) \quad \text{(eq. 14)}$$

Taking the Laplace transforms of eqs. 8 and 9, respectively:

$$i_a(s) = \frac{T_m(s)}{K_t} \quad \text{(eq. 15)}$$

$$V_a(s) = K_b \cdot s \cdot \Theta(s) \quad \text{(eq. 16)}$$

By substitution of eq. 13 into eq. 16, and then into eq. 14

$$K_b \cdot s \cdot \frac{T_m(s)}{(J_m \cdot s^2 + D_m \cdot s)} = \left(\frac{1}{C \cdot s} + L_a \cdot s + R_a\right) \cdot i_a(s) \quad \text{(eq. 17)}$$

$$\frac{i_a(s)}{T_m(s)} = \frac{K_b \cdot s}{(J_m \cdot s^2 + D_m \cdot s) \cdot \left(\frac{1}{C \cdot s} + L_a \cdot s + R_a\right)} \quad \text{(eq. 18)}$$

Eq. 18 is the transfer function of the motor. Thus given the torque acting upon the motor, the current of the motor circuit can be determined.

Figure 3:
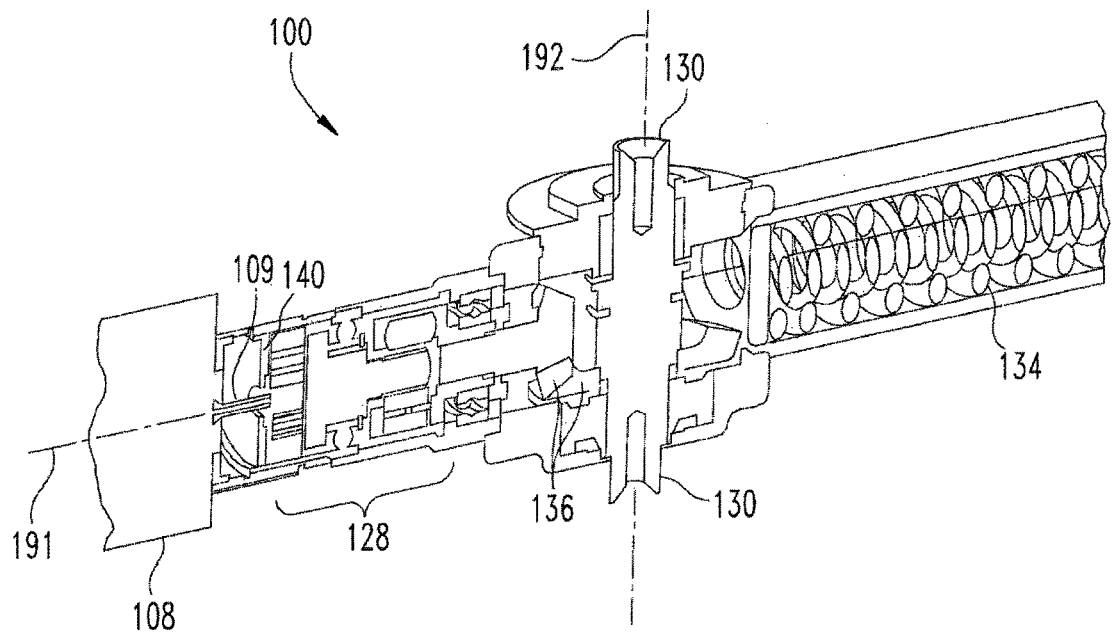
FIG. 3 is an embodiment of a door closer having a planetary gear set.

Referring now to FIG. 3, a sectional view of one embodiment of door closer system 100 is provided that includes motor 108. Door closer system 100 of FIG. 3 also includes gear set 128 which in this embodiment includes a planetary gear set coupled to a rack (not shown in FIG. 3 for clarity) and pinion 130, where the pinion 130 acts as a pivot for a closer arm (not shown,) and spring or spring assembly 134. The rotational axis 191 of the shaft 109 of motor 108 may be in-line with or parallel to the gear set 128 (e.g., the planetary gear set), which may then be coupled at its opposite end to the pinion 130 via a bevel gears 136. The rotational axis 192 of the pinion 130 may be orthogonal to the rotational axis 191 of the shaft 109 of motor 108. The pinion 130 is coupled to the rack 132, and the rack 132 is coupled to the spring or spring assembly 134.

As the door is opened by a user, an arm, or a set of arms that are attached to a door frame (not shown), pivots and rotates the pinion 130. The angular displacement of the pinion 130 is converted to linear displacement via the rack 132. As the rack 132 linearly translates, the spring 134 is compressed. Compressing the spring 134 and translation of rack 132 rotates pinion 130, which further rotates gear set 128 (e.g., the planetary gear set) and the shaft of motor 108. The impedance of control circuit 116 dampens the opening force and stores mechanical energy in storage device 122 as electrical energy which can be used to operate motor 108 for closing the door.

As the door is closing, the spring 134 expands pushing against the rack and rotates the pinion 130. The rotating pinion 130, in turn, pivots an arm or set of arms attached to a door frame, which closes the door. Also as the pinion 130 turns, the bevel gear 136 turns about an axis substantially orthogonal to the rotational axis of pinion 130. The bevel gear 136 is coupled to the gear set 128 (e.g., the planetary gear set), which turns the shaft of electrical motor 108 to generate power through control circuit 116 that is stored as electrical energy in storage device 122. In the final phase of closing, the motor 108 receives the stored electrical power from storage device 122 through control circuit 116 to provide a boost force to assist the spring 134 in closing the door to a closed position. The rotational torque of the motor 108 is transferred back to the arm or set of arms attached to the door frame through the gear set 128 (e.g., the planetary gear set), and bevel gear 136 and pinion 130.

Figure 4:
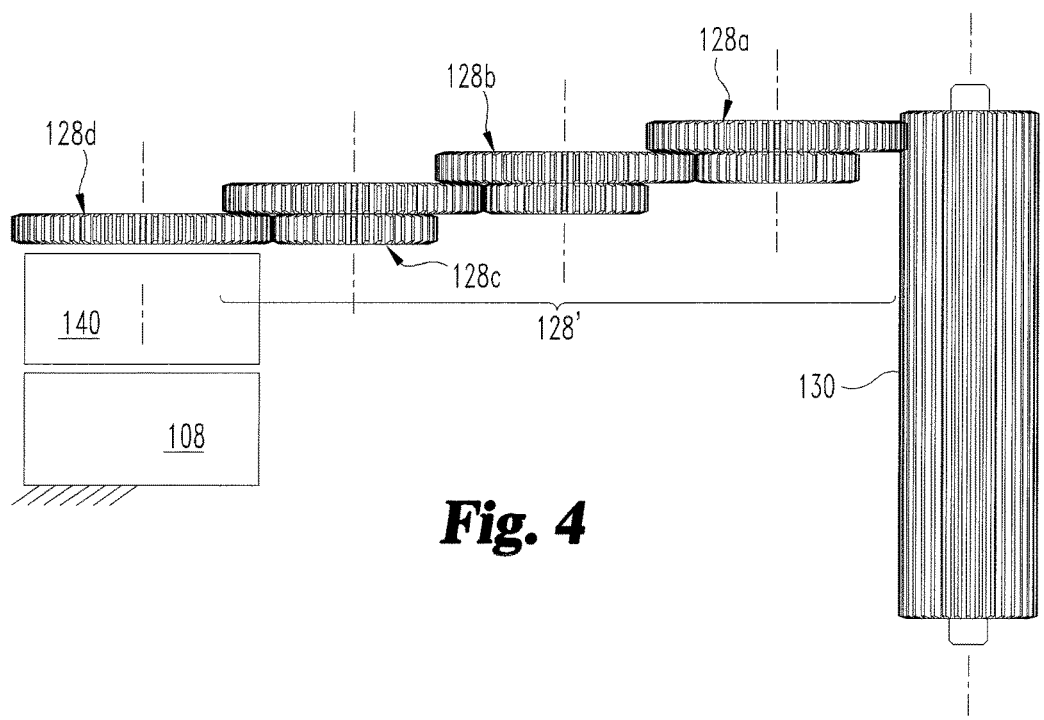
FIG. 4 is an embodiment of a door closer having a spur gear set.

With reference now to FIG. 4, the motor 108 may be mounted within the door closer system 100 such that the rotational axis of a shaft extending from the motor 108 is parallel to the axis of rotation of the pinion 130 and coupled to the pinion 130 through another embodiment of gear set 128, which may include a plurality of spur reduction gears. As shown, four spur reduction gears 128a, 128b, 128c, 128d are provided in the gear set 128 of FIG. 4. However, other configurations with more or fewer gears are contemplated. The gear set 128 is coupled to the motor 108 by a coupling assembly 140, exemplary embodiments of which are described below with reference to FIGS. 5-8. The gear set 128 with spur reduction gears is intended to increase the rotational speed of the motor 108 while reducing the torque applied to the motor 108.

Referring now to FIGS. 5-8, illustrated therein are multiple example embodiments of the coupling assembly 140 which couples the motor 108 to the gear set 128. As shown, these coupling examples are applied to a spur gear set such as shown in FIG. 4. However, it is further contemplated that the connection arrangements disclosed with reference to FIGS. 5-8 may also be applied with the gear set 128 illustrated in FIG. 3 (e.g., the planetary gear set). The gear set 128 may be used to drive the motor 108 to break or dampen the closing operation of the door. However, the motor 108 and electronics of control circuit 116 can only handle a certain amount of torque before they may become damaged. Accordingly, damage may occur if there is an extreme wind gust, or a user trying to force the door open or closed. Under such conditions, the door may be forced to close faster than the motor 108 and the electronics of control circuit 116 assembly can tolerate.

As shown in FIGS. 5-8, various embodiments of the coupling assembly 140, which may be clutches or clutch means, are disclosed to allow the gear set 128 to disengage from the motor 108 in order to protect the motor 108 while maintaining reliable control of the door. Disengaging the gear set 128 from the motor 108 will introduce some slipping between the motor 108 and, for example, the gears 128a, 128b, 128c, 128d. Therefore, the timing between the gears 128a, 128b, 128c, 128d and motor 108 may need to be realigned at some point after the applied torque is no longer excessive and the motor 108 is no longer in danger of being damaged. As an example, the gear set 128 may slip until the door is closed and then re-engage the gear set 128, such as by using encoders on each gear (the motor gear and the gear set gear) to know the position of each gear from a known starting point.

Figure 5:
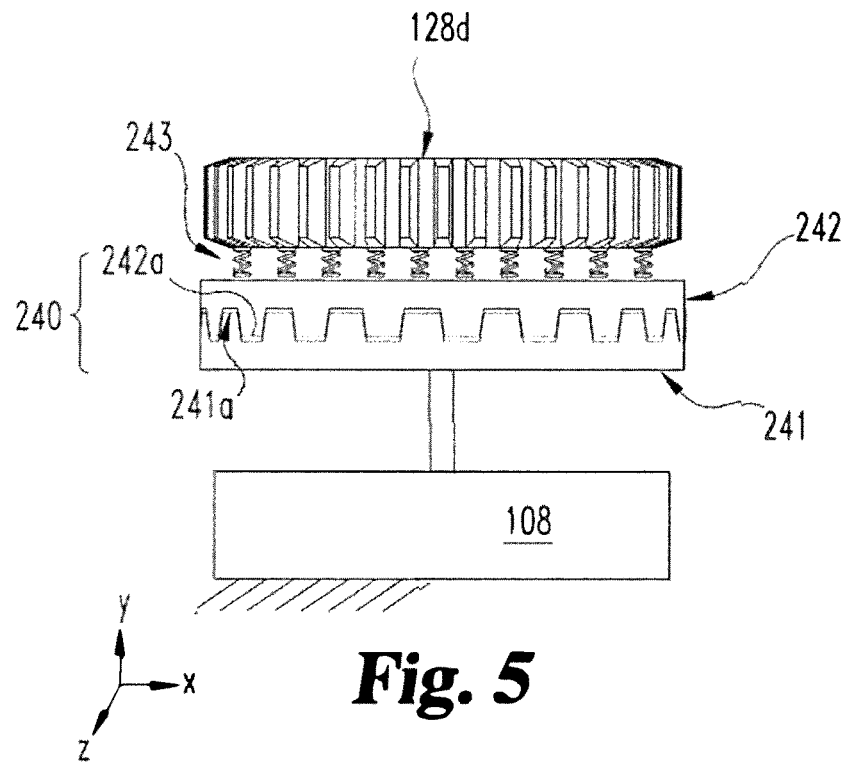
FIGS. 5-8 depict embodiments of various clutch mechanisms to selectively couple a motor to a gear set.

With reference to FIG. 5, an example clutch type coupling mechanism 240 is provided that includes a spring loaded slip disk 242 coupled to gear 128d with compression springs 243 and that further interfaces with and is coupled to a motor coupler 241. Both the slip disk 242 and motor coupler 241 have the same angle-toothed geometry on facing surfaces 242a, 241a, respectively, that provides the interface and therebetween. The compression springs 243 may have enough load resistance capability to prevent the slip disk 242 from moving in the positive y-direction under normal opening and closing loads. Under normal conditions, the slip disk 242, compression springs 243, and gear 128d all rotate as a single unit. Under extreme loading/torques the angled surfaces 242a and 241a of the slip disk 242 and motor coupler 241 generate a strong enough force in the y-direction to overcome the spring force allowing the slip disk 242 to move in the positive y-direction. This causes the slip disk 242 and motor coupler 241 to become disengaged, and allows the gear 128d and motor 108 to rotate at different speeds. After the system returns to normal operation from the overload, the slip disk 242 and motor coupler 241 would become re-engaged by the force of compression springs 243. There may need to be encoders or other means of determining the orientation of the slip disk 242 (which may also be dictated by door position) relative to the orientation of the motor coupler 241, such that when the gears 128 become gear set 128 becomes reengaged the system 100 would know the door position.

Figure 6:
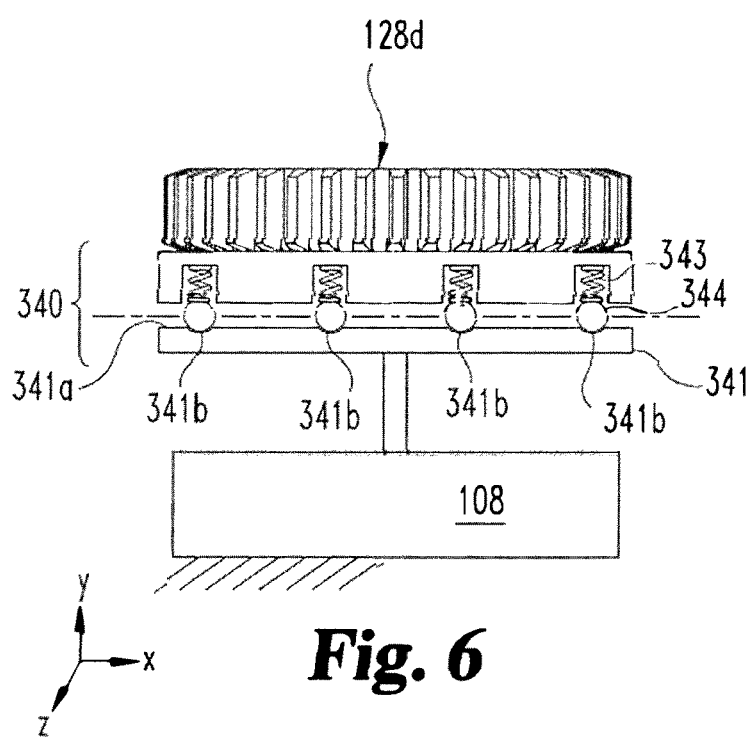

With reference now to FIG. 6, another example of a clutch-type mechanism 340 is provided that includes a set of spring-loaded ball bearings 344 coupled to pockets 341b of the motor coupler 341. The centers of ball bearings 344 sit above the top surface 341a of the motor coupler 341. As the gear 128d is turned, the ball bearings 344 will want to slip past the motor coupler 341 since the bearings are sitting high. However, the spring 343 force keeps the bearings 344 in place and allows the gear 128d and motor coupler 341 to rotate at the same speed. In an overload situation, the y-direction bearing force is strong enough to overcome the spring force and allows the gear 128d and the motor coupler 341 to become disengaged and rotate at different speeds.

Figure 7A:
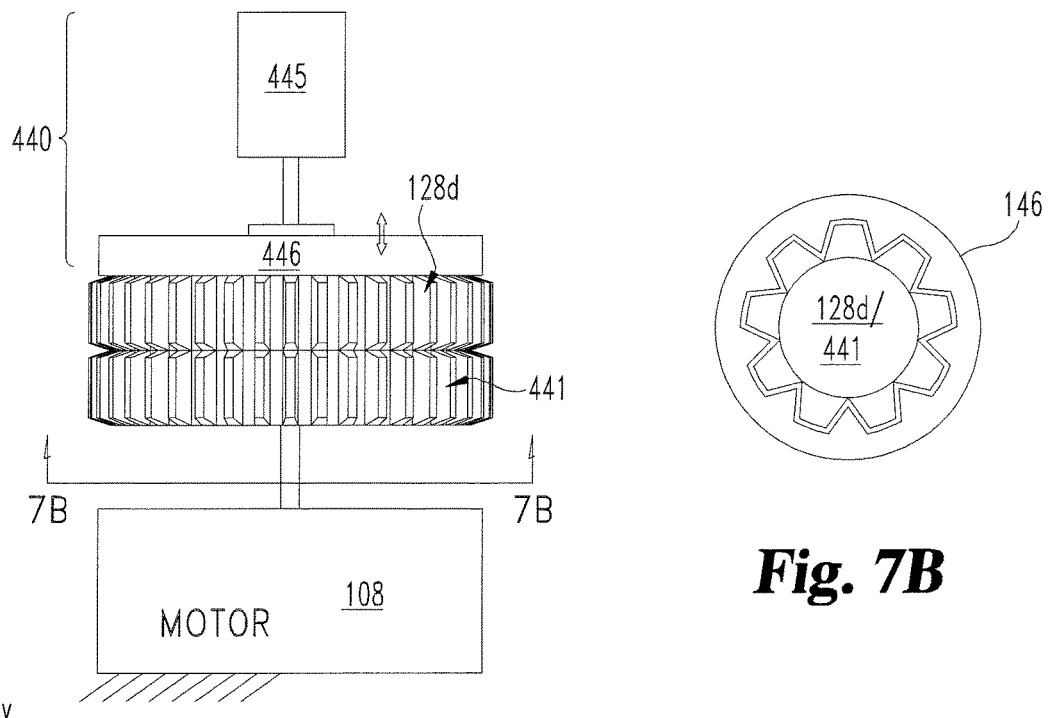
Figure 7B:
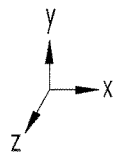

Referring now to FIGS. 7A and 7B, another embodiment of clutch mechanism 440 is provided that includes an electromechanical actuating device 445, such as solenoid, and a gearing coupler 446 that, in one example, is a sleeve that shrouds or envelopes both the gear 128d and motor coupler 441. This embodiment requires that the gear 128d and motor coupler 441 possess identical gear geometry, with the sleeve 446 being capable of engaging the teeth of both the gear 128d and motor coupler 441 simultaneously, such as shown in FIG. 7B. In normal operation, the sleeve 446 would envelope and engage both the gear 128d and the motor coupler 441 simultaneously, allowing all three components 128d, 441, 446 to rotate at the same speed. In the situation of an overload/excessive torque, the system will send a signal to the actuating device 445 to pull the gearing coupler 446 away from the motor coupler 441 causing the gear 128d and motor coupler 441 to become disengaged. As a fail-safe mechanism, the actuating device 445 home position could be for the gear 128d and motor coupler 441 to be engaged, and the actuated position would be with the sleeve 446 only engaging the gear 128d. However, an opposite failsafe arrangement is not precluded.

Figure 8:
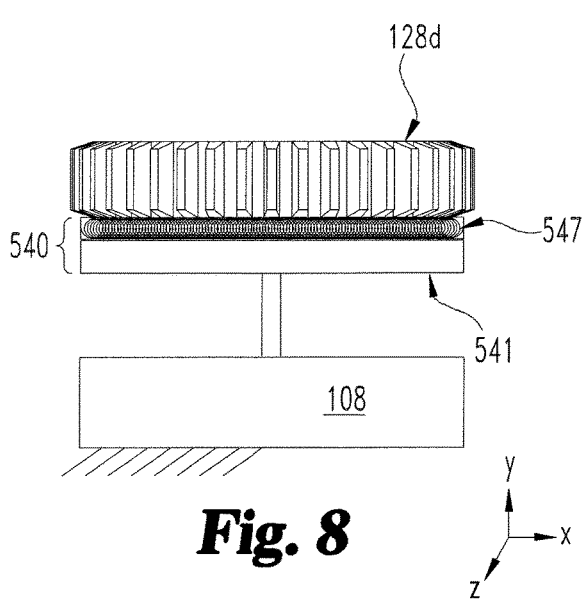

With reference now to FIG. 8, another embodiment of clutch mechanism 540 which may be used as the coupling assembly 140 is provided with a magnetic connector 547 between the gear 128d and the motor coupler 541. The magnetic connector 547 could be created by a magnet or magnetic layer attached to either the gear 128d or the motor coupler 541. The other component would include sufficient ferrous material or composition to be affected by the magnetic field of the magnetic connector 547. The magnetic connector 547 strength and distance between the gear 128d and coupler 541 would be designed such that the magnetic force would be strong enough to keep the gear 128d and the motor coupler 541 engaged under normal torsional loads and allowed to slip in an overload situation.

The various forms of the coupling assembly 140 shown in FIGS. 5-8 as the clutch mechanisms 240 et seq. are tied to the motor coupled to a gear set 128 provided in the form of a spur gear set. However, it is appreciated that similar concepts may be applied to a planetary gear set, such as shown in FIG. 3, or to the connection between the gear set 128 and pinion 130 instead.

An example system 100 may provide current to control circuit 116 from rotation of a shaft connected to motor 108 in order to induce impedance and allow the motor 108 to dampen the opening and/or closing action of the door. An example system may also be capable of harvesting any available energy to be supplied to the motor 108 in order to provide a boost force to securely close the door or any other energy requirement of the door and/or door closer system 100.

The motor 108 of system 100 may include a variety of forms for generating current for energy harvest as well as provide dampening to the door closer system 100. Any electromechanical device capable of generating a current may be utilized through appropriate control circuitry 116 to provide a dampening force to the door closer system 100. As such, this would not require a fluid damper as is typically found in door closers. In addition, any electromechanical device capable of providing current may also be utilized to provide means of harvesting energy from the actions of the door closer system 100. These electromechanical devices may include, for example, EDDIE brake systems, Linear motors and actuators, generators and alternators, AC and DC motors—both brushed and brushless, power boost systems that may incorporate batteries and or capacitors that may be interchangeable or chargeable, as well as systems that may add power to the system through other power generation means such as solar power or wind generated power.

One aspect of the present disclosure provides a door closer system having a motor, a spring, a reduction gear set, and a rack and a pinion. The spring is mechanically coupled to the rack. The pinion is coupled to the rack and coupled to the gear set 128, such as, for example, a reduction gear set. The motor is mechanically coupled to the reduction gear set. The pinion is rotatable in a first direction about a rotational axis of the pinion to translate the rack and compress the spring and rotation of the pinion in the first direction is impeded by the motor through the reduction gear set. The spring is expandable to act upon the rack and rotate the pinion in a second direction about the rotational axis that is opposite the first direction with rotation of the pinion in the second direction impeded by the motor through the reduction gear set. The motor is configured to generate electricity while impeding rotation of the pinion. The motor is operable with the electricity to rotate the gear set to rotate the pinion in the second direction.

A refinement of the present disclosure provides that the pinion rotation in the first direction is impeded through a control circuit connected to the motor.

Another refinement of the present disclosure provides that the pinion rotation in the second direction is impeded through a control circuit connected to the motor.

Yet another refinement of the present disclosure provides that the spring is expandable to selectively rotate the motor through the rack and pinion and reduction gear set to generate electricity.

Another refinement of the provides that the reduction gear set includes a spur gear set connecting the motor to the pinion.

Another refinement of the provides that the reduction gear set includes a planetary gear set connecting the motor to the pinion.

Yet another refinement of the provides that the pinion is coupled to the planetary gear set with a bevel gear.

Another refinement of the provides that the motor is selectively coupled to the reduction gear set with a clutch mechanism, and the clutch mechanism may be configured to disengage the motor from reduction the gear set if rotation of the motor exceeds a preset rate.

Another aspect of the present disclosure provides a doorway including a door and a door closer system mechanically coupled to the door. The door closer system includes a motor, a control circuit connected to the motor, and a power storage device connected to the motor and the control circuit. The door closer system further including a spring that compresses when the door is opening and expands when the door is closing. The spring is mechanically coupled to the motor through a gear set. The motor rotates in a first direction in response to expanding of the spring to generate electrical energy that is stored in the power storage device. The control circuit is configured to discharge electrical energy from the power storage device to rotate the motor in the first direction to close the door.

A refinement of the present disclosure provides that the motor rotates in a second direction in response to compression of the spring during opening of the door to generate electrical energy that is stored in the power storage device. Another refinement of the present disclosure provides that the motor includes a shaft connected to a gear set, and the gear set is connected to a pinion that is connected to a rack coupled to the spring. Yet another refinement of the present disclosure provides that the motor impedes closing of the door through the control circuit. Another refinement further provides a clutch-type coupling mechanism configured to mechanically decouple the motor from the gear set if the force opening the door exceeds a preset limit.

Yet another refinement further provides a clutch-type coupling mechanism configured to mechanically decouple the motor from the door if a force moving the door exceeds a preset rate.

Yet another aspect of the present disclosure provides: opening a door coupled to a spring, thereby compressing the spring; releasing the door and allowing the spring to expand to initiate closing of the door; generating electricity with a motor operable in response to compression and expansion of the spring during opening and closing the door; storing the electricity in a storage device; and rotating the motor with the electricity to close the door.

Other refinements may include: decoupling the motor from the door if opening or closing the door exceeds a preset rate; rotating the motor rotates a gear set connected to the spring with a rack and pinion mechanism, wherein the gear set is one of a planetary gear set and a spur gear set; and generating the electricity with the motor dampens at least one of a closing rate and an opening rate of the door.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A door closer system, comprising:
a motor, a spring, a reduction gear set, a rack, a pinion, and a power storage device;
said spring is mechanically coupled to said rack;
said pinion matingly engaged with said rack and directly matingly engaged with said reduction gear set;
said motor is mechanically coupled to said reduction gear set, said motor having a shaft, said shaft being rotatable in a first shaft direction and a second shaft direction, said motor converts rotation of said shaft in said first shaft direction into a generated electrical power;
said power storage device configured to store and discharge said generated electrical power;
wherein said pinion is rotatable in a first direction about a rotational axis of said pinion to translate said rack and compress said spring, rotation of said pinion in said first direction is impeded by said motor through said reduction gear set, wherein said first direction corresponds with an opening direction of a door;
wherein said spring expands to act upon said rack and rotate said pinion in a second direction about said rotational axis that is opposite said first direction with rotation of said pinion in said second direction impeded by said motor through said reduction gear set, wherein said second direction corresponds with a closing direction of said door;
said reduction gear set translates rotation of said pinion in said first direction into rotation of said shaft of said motor in said first shaft direction; and
said power storage device discharges said generated electrical power stored by said power storage device to said motor to provide power to rotate said gear set to rotate said pinion in said second direction during at least a phase of rotation of said pinion in said second direction.

2. The system of claim 1, wherein said spring is expandable from a compressed state to an extended state, said rack being linearly displaced by expansion of said spring, such linear displacement of said rack facilitating rotational displacement of said pinion, such rotational displacement of said pinion translated, via said reduction gear set, into rotation of said shaft of said motor.

3. The system of claim 1, wherein said reduction gear set includes a spur gear set connecting the motor to the pinion.

4. The system of claim 3, wherein said shaft of said motor is selectively coupled to said reduction gear set with a clutch mechanism.

5. The system of claim 4, wherein said clutch mechanism disengages said motor from said reduction gear set if rotation of said motor exceeds a preset rate.

6. The system of claim 1, wherein the system is configured to be mechanically coupled to said door;
wherein said spring compresses when said door is opening and expands when said door is closing, wherein said spring is mechanically coupled to said shaft of said motor through said reduction gear set;
wherein said shaft of said motor rotates in a first shaft direction in response to expanding of said spring;
wherein said generated electrical power generated by rotation of said shaft of said motor in response to expansion of said spring is stored in said power storage device;
wherein said power storage device discharges said generated electrical power from said power storage device to said motor; and
wherein said motor rotates said shaft using the electrical power generated by and discharged from the power storage device to close said door.

7. The system of claim 6, wherein said shaft of said motor rotates in response to compression of said spring during opening of said door to generate said generated electrical power.

8. The system of claim 7, wherein said motor impedes closing of said door.

9. The system of claim 8, further comprising a clutch-type coupling mechanism that mechanically decouples said motor from said reduction gear set if a force opening said door exceeds a preset limit.

10. The system of claim 6, further comprising a clutch-type coupling mechanism that mechanically decouples said motor from said door if a force moving said door exceeds a preset rate.

11. The system of claim 1, wherein rotation of said pinion in at least one of said first direction and said second direction is impeded by said motor.

12. The system of claim 1, further comprising a control circuit that controls said motor and receives operational data of said motor via feedback control sensors.

13. The system of claim 12, wherein said power storage device powers said control circuit by discharging said generated electrical power stored by said power storage device to said control circuit.

14. The system of claim 12, wherein each of said control circuit and said motor receives electrical power from only said power storage device.

15. The system of claim 12, wherein said control circuit determines a current to discharge to said motor from said power storage device based on a current torque acting upon said motor; and
wherein said control circuit controls said power storage device to discharge said determined current to said motor.

16. The system of claim 12, wherein said control circuit determines a current to discharge to said motor from said power storage device based on a transfer function of said motor; and
wherein said control circuit controls said power storage device to discharge said determined current to said motor.

17. The system of claim 1, wherein said motor further converts rotation of said shaft in said second shaft direction into said generated electrical power during a first phase of rotation of said shaft in said second shaft direction; and
wherein said power storage device discharges said generated electrical power stored by said power storage device to said motor during a phase of rotation of said pinion in said second direction corresponding with a second phase of rotation of said shaft in said second shaft direction.

18. A door closer system, comprising:
a motor, a spring, a reduction gear set, a rack, a pinion, and a power storage device;
said spring is mechanically coupled to said rack;

said pinion matingly engaged with said rack and matingly engaged with said reduction gear set;

said motor is mechanically coupled to said reduction gear set, said motor having a shaft, said shaft being rotatable in a first shaft direction and a second shaft direction, said motor converts rotation of said shaft in said first shaft direction into a generated electrical power;

said power storage device configured to store and discharge said generated electrical power;

wherein said pinion is rotatable in a first direction about a rotational axis of said pinion to translate said rack and compress said spring, rotation of said pinion in said first direction is impeded by said motor through said reduction gear set, wherein said first direction corresponds with an opening direction of a door;

wherein said spring expands to act upon said rack and rotate said pinion in a second direction about said rotational axis that is opposite said first direction with rotation of said pinion in said second direction impeded by said motor through said reduction gear set, wherein said second direction corresponds with a closing direction of said door;

said reduction gear set translates rotation of said pinion in said first direction into rotation of said shaft of said motor in said first shaft direction; and said power storage device discharges said generated electrical power stored by said power storage device to said motor to provide power to rotate said gear set to rotate said pinion in said second direction;

wherein said reduction gear set includes a spur gear set connecting the motor to the pinion;

wherein said shaft of said motor is selectively coupled to said reduction gear set with a clutch mechanism;

wherein said spur gear set comprises a set of four spur reduction gears including a first gear, a second gear, a third gear, and a fourth gear;

wherein the first gear is matingly engaged with the pinion and the second gear;

wherein the second gear is matingly engaged with the first gear and the third gear;

wherein the third gear is matingly engaged with the second gear and the fourth gear; and wherein the fourth gear is matingly engaged with the third gear and operably coupled to the clutch mechanism.

\* \* \* \* \*